(12) United States Patent
Lee

(10) Patent No.: US 8,083,247 B2
(45) Date of Patent: Dec. 27, 2011

(54) ARM SUPPORTER OF BICYCLE

(76) Inventor: Su Dong Lee, Gyeonggi-do (KR)

( * ) Notice: Subject to any disclaimer, the term of this patent is extended or adjusted under 35 U.S.C. 154(b) by 0 days.

(21) Appl. No.: 12/723,220

(22) Filed: Mar. 12, 2010

(65) Prior Publication Data

US 2010/0244403 A1 Sep. 30, 2010

(30) Foreign Application Priority Data

Mar. 26, 2009 (KR) ........................ 10-2009-0025865

(51) Int. Cl.
*B62J 9/00* (2006.01)
(52) U.S. Cl. ..................................... 280/288.4; 297/466
(58) Field of Classification Search ............. 280/288.4; 74/551.1, 551.8; 297/466
See application file for complete search history.

(56) References Cited

U.S. PATENT DOCUMENTS

| | | | | |
|---|---|---|---|---|
| 5,154,094 A | * | 10/1992 | Klieber | 74/551.1 |
| 5,197,350 A | * | 3/1993 | Borromeo | 74/551.8 |
| 5,429,013 A | * | 7/1995 | Taylor et al. | 74/551.1 |
| 6,435,523 B1 | * | 8/2002 | Hilk | 280/7.11 |
| 6,564,673 B1 | * | 5/2003 | Kilmer | 74/551.8 |
| 6,662,680 B2 | * | 12/2003 | Rocket | 74/551.3 |
| 6,928,897 B2 | * | 8/2005 | Duncan | 74/551.8 |
| 7,207,237 B2 | * | 4/2007 | Johnson | 74/551.8 |

FOREIGN PATENT DOCUMENTS

JP 07-267166 10/1995

* cited by examiner

*Primary Examiner* — Tashiana Adams
(74) *Attorney, Agent, or Firm* — Garcia-Zamor IP Law; Ruy M. Garcia-Zamor

(57) ABSTRACT

Provided is an arm support of a bicycle which is configured to reduce an intensive pressure acting from a seat due to the rider's weight inclined at the seat by spreading the inclined weight to other parts. The rider can get on or off the bicycle more easily by putting his/her arms on the arm support. In the bicycle including a frame, a seat disposed at the frame, a handle for controlling the direction of the bicycle, and wheels rotatably coupled to the frame, the arm support includes: a support shaft including a coupling part fixed to the frame: a support bar disposed at an upper side of the support shaft and connected to both sides of the support shaft; and armrests coupled to the support bar so that a rider puts his/her arms thereon The armrests extend horizontally from the vertical support bars and bent toward the seat or upward to form armrest channels.

1 Claim, 5 Drawing Sheets

ARM SUPPORTER OF BICYCLE

CROSS-REFERENCE TO RELATED APPLICATIONS

This application claims priority under 35 U.S.C. §119 to Korean Patent Application No. 10-2009-0025865, filed on Mar. 26, 2009, the disclosure of which is incorporated herein by reference in its entirety.

TECHNICAL FIELD

The present invention relates to an arm supporter, and more particularly, to an arm supporter of a bicycle for spreading the rider's weight from the seat to other parts of the rider's body to reduce inclination of the rider's weight and a pressure acting on the rider from the seat and allowing the rider to lean when riding or getting off the bicycle so that the rider can conveniently ride and get off.

BACKGROUND

As shown in FIG. 1, a typical bicycle includes a frame 10, a seat 20 mounted on the frame 10, a handle 30 for handling the moving direction of the bicycle, wheels 40 rotatably coupled to the frame 10, pedals 50 for rotating the wheels 40, and a power transmission part 60 for transmission power from the pedals 50 to the wheel 40. Most handling devices or driving devices are installed on the frame 10.

If a rider sits on the seat 20 and rotates the pedals 50, power is transmitted from the pedals 50 to the wheels 40 so that the bicycle can be driven. In this case, the rider sitting on the seat 20 may continuously rotate the pedals 50 by applying his leg power. For this, if the rider sits on the seat 20 and moves his legs, the rider's weight may be concentrated on the seat 20, and thus his buttocks may be intensively pressed.

Due to the pressure exerted by the seat 20, blood flow in the perineal region may be reduced, and thus blood circulation may be restricted. That is, frequent and long time cycling may result in many side effects such as prostatitis.

Moreover, when riding, getting on or getting off the bicycle, a rider should always grip the handle 30 and pay attention to the handle 30, and thus comfortable and convenient cycling may not be assured. Moreover, since motions for getting on and off the bicycle are taken only by gripping the handle 30, it may be difficult to maintain body balance, and such motions may be inconvenient.

SUMMARY

Accordingly, the present invention provides an arm support of a bicycle which is configured to reduce an intensive pressure acting from a seat due to the rider's weight inclined at the seat by spreading the inclined weight to other parts of the rider's body.

The present invention also provides an arm support which can be addition installed on a bicycle so that a rider can get on or off the bicycle more easily by putting his/her arms on the arm support.

According to an aspect, there is provided an arm supporter of a bicycle including a frame, a seat disposed at the frame as a place for sitting, a handle configured to control a moving direction of the bicycle, and wheels rotatably coupled to the frame, the arm support including: a support shaft including a coupling part fixed to the frame: a support bar disposed at an upper side of the support shaft and connected to both sides of the support shaft; and armrests coupled to the support bar so that a rider puts his/her arms thereon, wherein the coupling part includes: an upper coupling housing fixedly coupled to a lower end of the support shaft, the upper coupling housing including a groove so that the upper coupling housing is placed along the frame and couples to the frame, and a flange provided at a peripheral part of the groove; a lower coupling housing coupled to the upper coupling housing along the frame with the frame being disposed therebetween, the lower coupling housing including a groove corresponding to the groove of the upper coupling housing and a flange provided at a peripheral part of the groove; bolt holes formed along the flanges of the upper and lower coupling housings; and bolts configured to be coupled to the bolt holes to fix the upper and lower coupling housings to the frame via the flanges, wherein the support bar includes: a horizontal support bar extending horizontally from both sides of the support shaft; and a vertical support bars bent upward from the horizontal support bar so that the armrests is attached to the vertical support bars, wherein the armrests extend horizontally from the vertical support bars and bent toward the seat to form armrest channels.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF EMBODIMENTS

Hereinafter, embodiments of the present invention will be described in detail with reference to the accompanying drawings.

Figure 1:
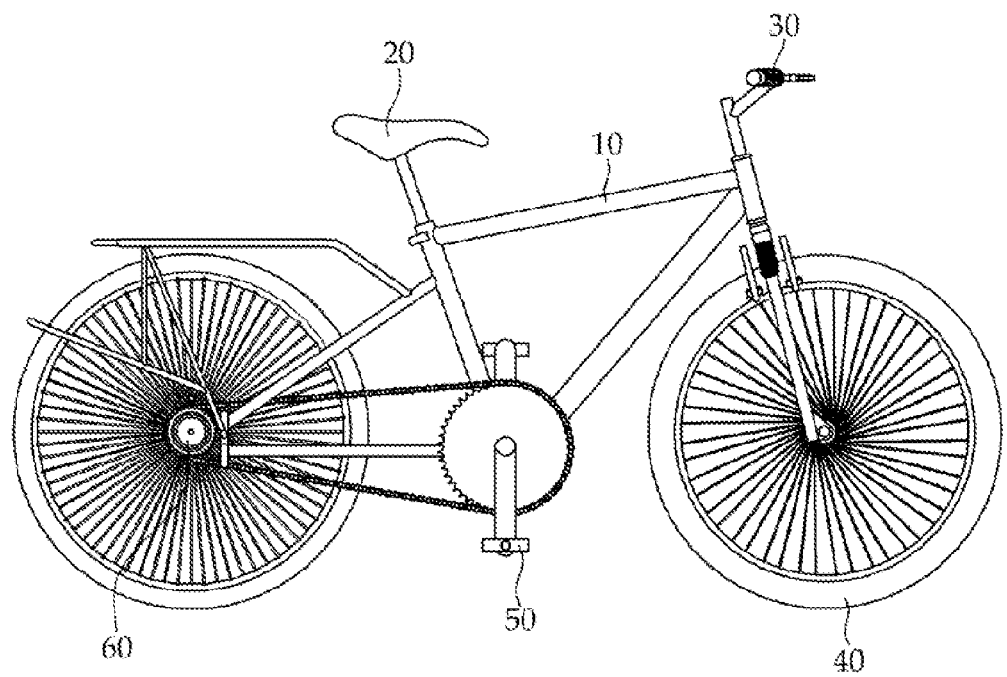
FIG. 1 is a view illustrating the structure of a general bicycle.
Figure 2:
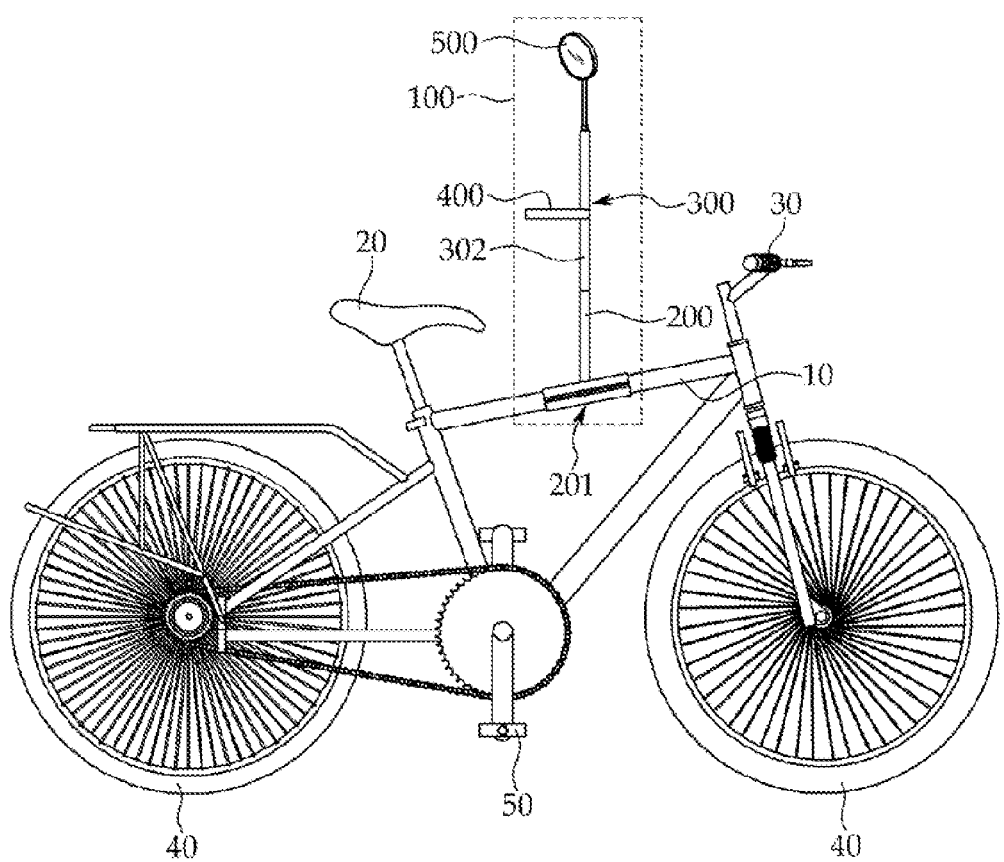
FIG. 2 is a view illustrating the structure of an arm supporter according to an embodiment of the present invention.

According to an embodiment of the present invention, as shown in FIG. 2, an arm support 100 is installed on a bicycle including a frame 10, a seat 20 installed on the frame 10 for providing a place on which a rider can sit, a handle 30 for controlling the moving direction of the bicycle, and wheels 40 rotatably coupled to the frame 10.

The arm support 100 includes a support shaft 200 having a coupling part 201 fixed to the frame 10, a support bar 300 disposed at the upper side of the support shaft 200 and is connected to both sides of the support shaft 200, and armrests 400 coupled to the support bar 300 so that a rider can put his arms thereon.

Figure 3:
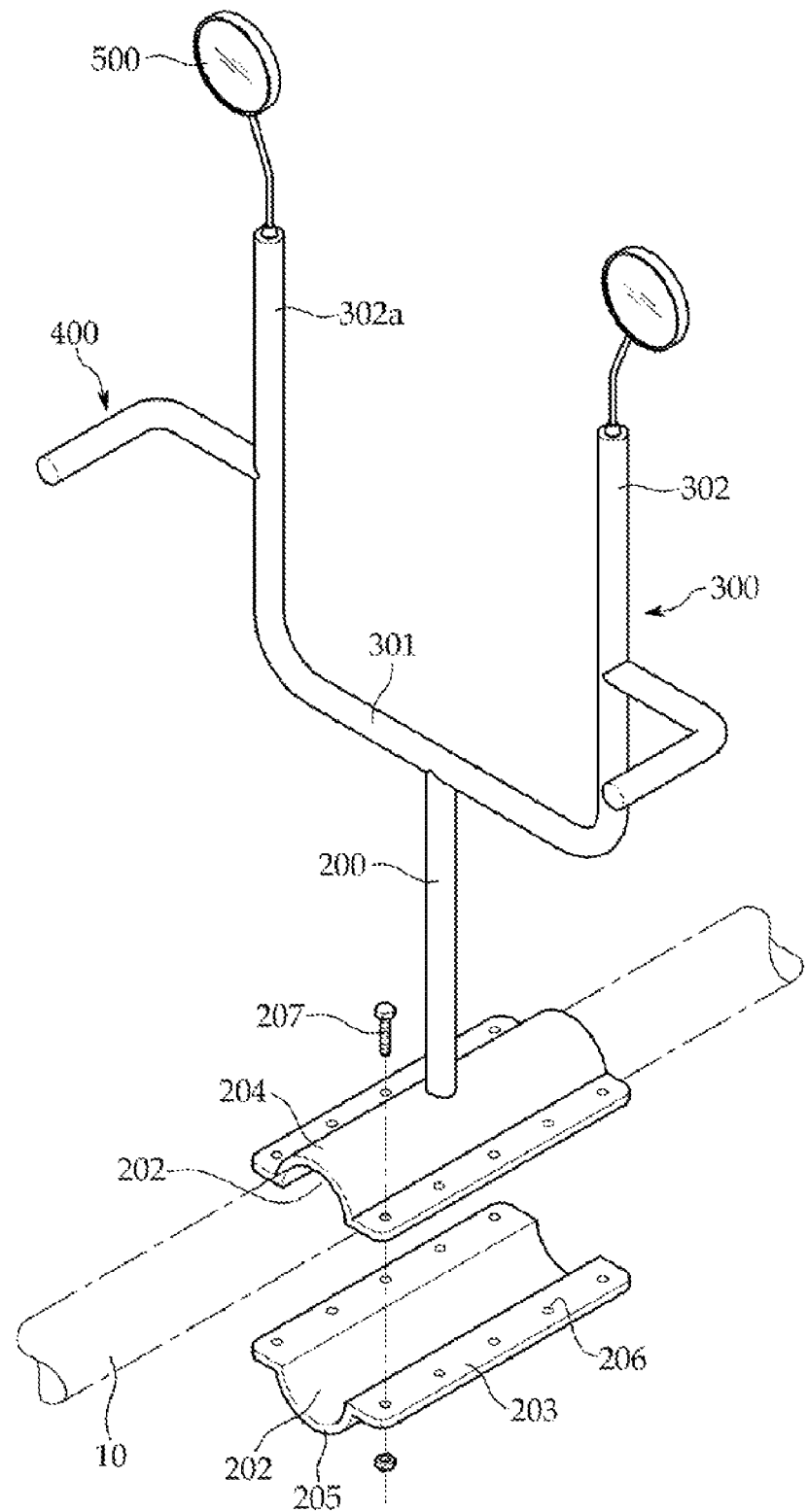
FIG. 3 is a detailed view illustrating the structure of the arm supporter according to an embodiment of the present invention.

As shown in FIG. 3, the coupling part 201 may include an upper coupling housing 204 coupled to the lower end of the support shaft 200, and a lower coupling housing 205 coupled to the upper coupling housing 204. The upper coupling housing 204 may include a groove 202 so that the upper coupling housing 204 can be placed along the frame 10 and coupled to the frame 10, and flanges 203 provided at peripheral parts of the groove 202.

The lower coupling housing 205 may include a groove 202 corresponding to the groove 202 of the upper coupling housing 204, and flanges 203 provided at peripheral parts of the groove 202, so as to be coupled along the frame 10. The lower coupling housing 205 may be coupled to the upper coupling housing 204 with the frame 10 being disposed therebetween.

Bolt holes 206 are formed in the flanges 203 so that the upper and lower coupling housings 204 and 205 can be coupled along the frame 10 by coupling bolts 207 to the bolt holes 206. Each of the grooves 202 formed in the upper and lower coupling housings 204 and 205 may have a semicircular shape corresponding to the shape of the frame 10.

Since the upper and lower coupling housings 204 and 205 make contact with the frame 10 over relatively large areas, the upper and lower coupling housings 204 and 205 can be firmly coupled to the frame 10, and if necessary, the upper and lower coupling housings 204 and 205 can be detached.

The coupling part 201 is detachably coupled by using the upper and lower coupling housings 204 and 205 as shown in FIGS. 2 and 3; however, alternatively, the support shaft 200 may be mounted on the frame 10 by welding.

The support bar 300 may include a horizontal support bar 301 extending horizontally from both sides of the support shaft 200, and vertical support bars 302 and 302a bent upward from the horizontal support bar 301 so that the armrests 400 can be attached to the vertical support bars 302 and 302a. It may not be necessary that the horizontal support bar 301 and the vertical support bars 302 and 302a are exactly horizontal and vertical. That is, the horizontal support bar 301 and the vertical support bars 302 and 302a may be approximately directed in horizontal and vertical directions.

The armrests 400 may extend horizontally from the vertical support bars 302 and 302a and bent toward the seat 20 to form armrest channels 401 as shown in FIG. 4(a), or the armrests 400 may extend horizontally from the vertical support bars 302 and 302a and bent upward to form armrest channels 401 as shown in FIG. 4(b).

Rearview mirrors 500 may be attached to the upper ends of the vertical support bars 302 and 302a so that a rider can view the rear side with the closer rearview mirrors 500.

The support shaft 200, the support bar 300, and the armrests 400 may be formed of a metal material or a nonmetal material. Furthermore, soft cloth patches or cushion pads may be attached to the surfaces of the support shaft 200, the support bar 300, and the armrests 400 so as to reduce impacts acting on the rider's body and improve contact feeling.

Functions of the armrests 400 will now be described according to the present invention.

Generally, when a rider sits on a seat of a bicycle, he usually grips a handle. That is, when a rider sits on the seat 20 with his hands holding the handle 30, the weight of the upper body of the rider is concentrated on the seat 20. In addition, when the rider pedals the bicycle by applying leg power, all the weight of the rider and the force exerted by the rider are concentrated on a part of the rider's body that makes contact with the seat 20. Therefore, when a rider sits on the narrow seat 20 for a long time, due to pressure acting on the part of the rider's body, blood flow at the body part may be reduced or blood circulation may not be smooth, and thus side effects may be caused.

Figure 4:
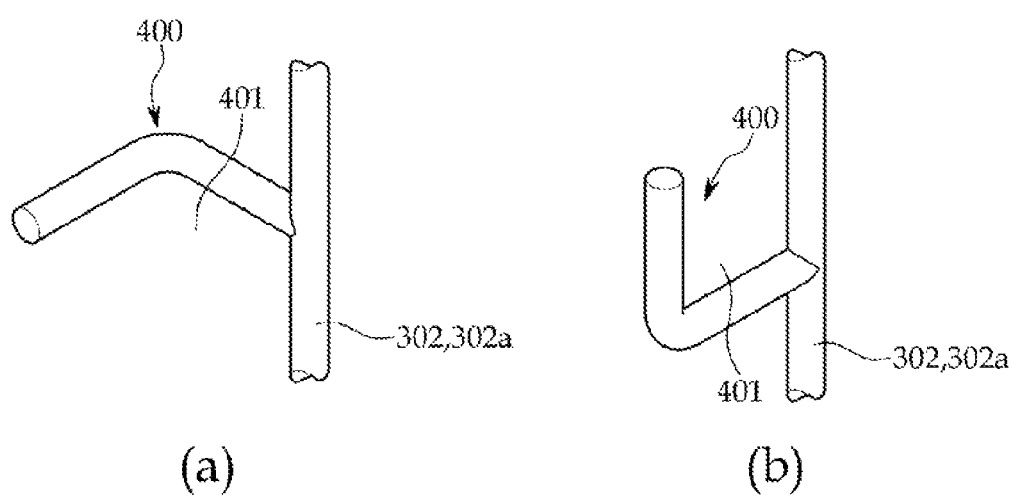
FIGS. 4(a) and 4(b) are views illustrating armrests according to embodiments of the present invention.

However, according to the present invention, as shown in FIGS. 2 to 4, the arm support 100 can be attached to the frame 10 by using the coupling part 201 if necessary.

Figure 5:
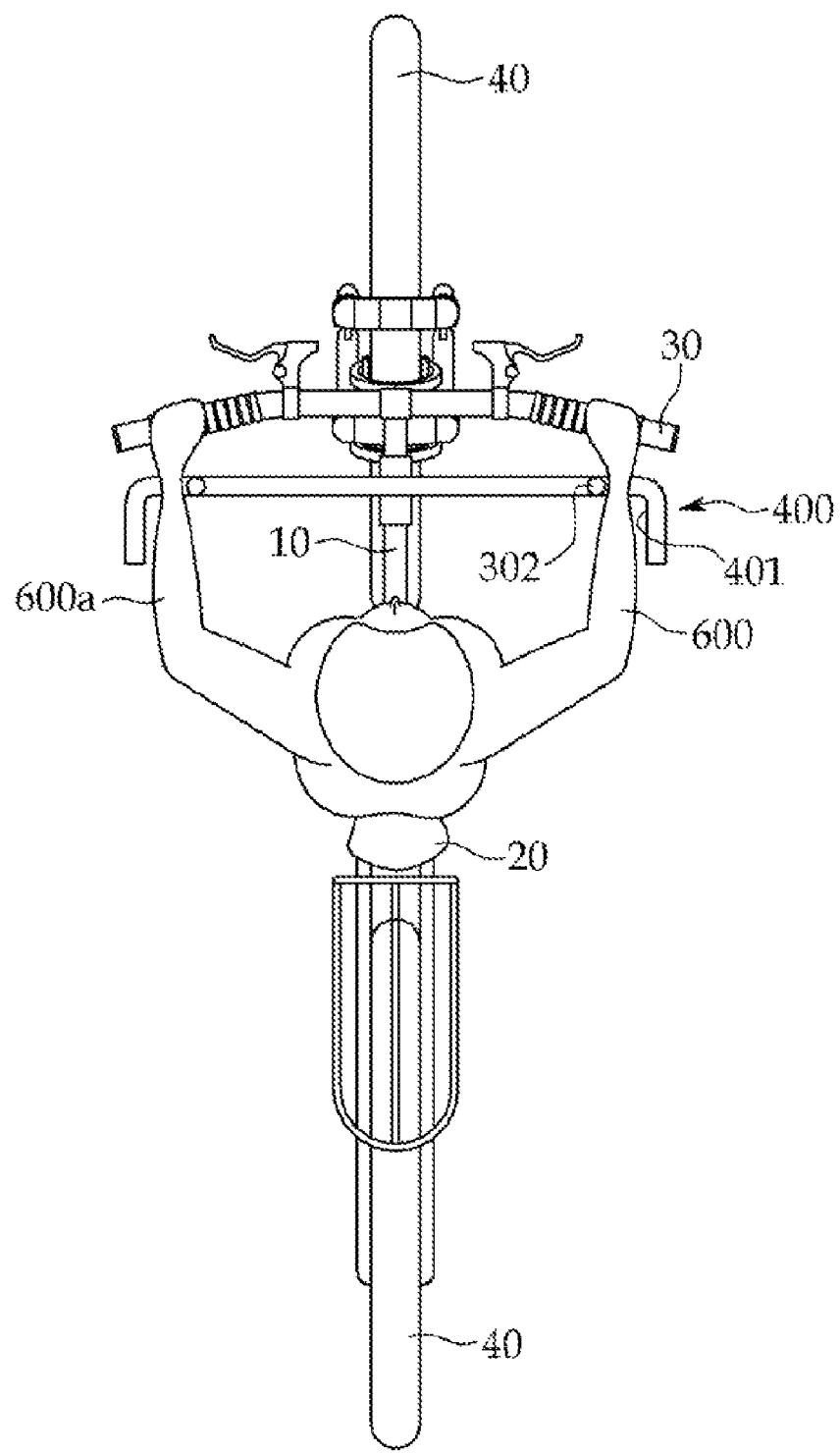
FIG. 5 is a view illustrating a usage example according to according to an embodiment of the present invention.

According to the present invention, as shown in FIG. 5, in a state where a rider sits on the seat 20, the rider can put both his arms 600 and 600a on the armrests 400 with his hands holding the front handle 30. As a result, the weight concentrated on the seat 20 can be spread. For example, a rider can put his arms 600 600a on the armrests 400 and lift his buttocks away from the seat 20. In this way, a rider can ride the bicycle with his arms 600 and 600a on the armrests 400, and thus the rider's weight concentrated on the seat 20 can be spread to his arms 600 and 600a.

In addition, a rider can smoothly ride the bicycle with his arms 600 and 600a on the armrests 400, or he can ride the bicycle while moving his body more freely by holding the armrests 400 with his arms 600 and 600a or hands. Therefore, when the ride gets on or off the bicycle, he can maintain balance more easily.

In addition, when the arm support 100 is attached to the bicycle, the rearview mirrors 500 can be attached to desired positions of the vertical support bars 302 and 302a. Therefore, closer rearview monitoring means can be provided to a rider.

As well as bicycles, the arm support 100 of the present invention can be applied to other two-wheel vehicles such as motorcycles.

For reference, weight distribution experiments were performed to measure weight acting on a seat of a bicycle when a rider sits on the seat after the arm support 100 is installed on the bicycle. Results of the experiments are follows.

Experimental Example 1

About 68-kg Adult Man

A scale was placed on an about 58-cm chair, and a person sat on the scale with his hands on an about 63-cm table. In that case, the weight of the person's buttock part was measured as 47 kg.

Then, an about 88-cm arm support 100 was placed between the chair and the table, and the person sat on the chair with his arms being deeply placed on armrests 400 of the arm support 100 (his armpits being placed on the armrests 400) and his hands on the table. In that case, the weight of the person's buttock part was measured to be 37 kg. That is, about 10 kg was reduced after the arm support 100 was used. That is, the weight distribution effect was about 21%=10 kg/47 kg*100.

Experimental Example 2

About 68-kg Adult Man

A bicycle on which an arm support 100 was not installed was fixed, and a flat seat was mounted on the bicycle (at a height of about 89 cm). Thereafter, a scale (having a height of about 5 cm) was placed on the seat, and then a person sat on the seat with his hands holding a handle (having a height of about 104 cm). In that state, the weight of the person's buttock part was measured to be about 50 kg. Next, the arm support 100 is installed on the bicycle, and the person sat on the seat with his arms being deeply placed on armrests 400 having a height of about 137 cm (his armpits being placed on the armrests 400) and his hands holding the handle. In that state, the weight of the person's buttock part was measured to be about 39 kg. That is, about 11 kg was reduced after the arm support 100 was installed. That is, the weight distribution effect was about 22%=11 kg/50 kg*100.

According to the present invention, the rider's weight concentrated on a seat of a bicycle can be spread to other parts of the rider's body, and thus an intensive pressure acting from the seat due to the rider's weight inclined at the seat can be reduced, thereby reducing side effects and providing convenient cycling. In addition, since the rider can put his/her body parts on the arm support when getting on or off the bicycle, he/she can get on or off the bicycle more easily.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An arm support for a bicycle including a frame, a seat disposed at the frame as a place for sitting, a handle configured to steer the bicycle, and wheels rotatably coupled to the frame, the arm support comprising: a support shaft comprising a coupling part configured to be fixed to the frame such that the support shaft does not pivot or rotate relative to the frame: a support bar disposed at an upper side of the support shaft; and armrests coupled to the support bar and configured to allow a rider to position his/her arms thereon, while simultaneously holding the handle, the armrests being fixed in position relative to the frame and not capable of steering the bicycle, whereby the arm support facilitates weight distribution of a rider on the bicycle by allowing the rider to engage the armrests while simultaneously steering the bicycle via the handle, the arm support being configured to be in a fixed position relative to the frame and not capable of steering the bicycle; wherein the coupling part comprises: an upper coupling housing fixedly coupled to a lower end of the support shaft, the upper coupling housing comprising a groove configured for positioning the upper coupling housing along the frame spaced from the handle; and a flange provided at a peripheral part of the groove; a lower coupling housing coupled to the upper coupling housing along the frame with the frame being disposed therebetween, the lower coupling housing comprising a groove corresponding to the groove of the upper coupling housing and a flange provided at a peripheral part of the groove; bolt holes formed along the flanges of the upper and lower coupling housings; and bolts configured to be coupled to the bolt holes to fix the upper and lower coupling housings to the frame via the flanges, wherein the support bar is configured to extend generally perpendicularly to a plane defined by the frame, the support bar having opposing ends on either side of the plane; a vertical support bar located on each of the opposing ends to support the armrests in a fixed position relative to the frame, wherein the armrests extend horizontally from the vertical support bars and are configured to provide armrest channels.

* * * * *